United States Patent
Lafleur et al.

(10) Patent No.: US 12,192,870 B1
(45) Date of Patent: Jan. 7, 2025

(54) SYSTEM, METHOD AND APPARATUS FOR NON-INVASIVE SENSOR CONFIGURATION AND NETWORKING

(71) Applicant: ORBCOMM, INC., Rochelle Park, NJ (US)

(72) Inventors: Phil Lafleur, Ontario (CA); Ronald Straz, Annadale, VA (US); Guenther Kramer, Gatineau (CA)

(73) Assignee: ORBCOMM, Inc., Rochelle Park, NJ (US)

( * ) Notice: Subject to any disclaimer, the term of this patent is extended or adjusted under 35 U.S.C. 154(b) by 137 days.

(21) Appl. No.: 17/750,294

(22) Filed: May 20, 2022

Related U.S. Application Data (60) Provisional application No. 63/191,068, filed on May 20, 2021.

(51) Int. Cl.
*H04W 4/80* (2018.01)
*H04W 76/14* (2018.01)
*G16Y 10/75* (2020.01)

(52) U.S. Cl.
CPC ............ *H04W 4/80* (2018.02); *H04W 76/14* (2018.02); *G16Y 10/75* (2020.01)

(58) Field of Classification Search
CPC ......... H04W 4/80; H04W 76/14; G16Y 10/75
USPC ...................................................... 455/41.2
See application file for complete search history.

(56) References Cited

U.S. PATENT DOCUMENTS

| | | | |
|---|---|---|---|
| 10,355,910 B1 * | 7/2019 | Kim | H04W 28/06 |
| 10,812,130 B2 * | 10/2020 | Talla | H04L 5/1461 |
| 10,827,345 B1 * | 11/2020 | Tandon | H04W 8/12 |
| 10,873,363 B2 * | 12/2020 | Gollakota | H04B 1/713 |
| 11,051,153 B1 * | 6/2021 | Aljohani | H03M 13/6306 |
| 11,201,981 B1 * | 12/2021 | Suiter | G06Q 30/0639 |
| 11,216,775 B1 * | 1/2022 | Ford | G06Q 10/0838 |
| 11,323,963 B1 * | 5/2022 | Lam | H04W 88/04 |
| 11,395,225 B1 * | 7/2022 | Wong | H04W 76/28 |
| 11,774,603 B1 * | 10/2023 | Humborg | G01S 19/52 342/357.35 |
| 2018/0165131 A1 * | 6/2018 | O'Hare | H04L 67/1001 |
| 2018/0167783 A1 * | 6/2018 | Khoche | B32B 37/12 |
| 2019/0037639 A1 * | 1/2019 | Nolan | H04B 7/15528 |
| 2019/0081716 A1 * | 3/2019 | Cole | B64D 1/02 |
| 2019/0209022 A1 * | 7/2019 | Sobol | A61B 5/02055 |
| 2019/0281370 A1 * | 9/2019 | Struhsaker | H04W 4/80 |
| 2019/0349426 A1 * | 11/2019 | Smith | H04W 4/70 |
| 2020/0027096 A1 * | 1/2020 | Cooner | G06Q 40/04 |
| 2020/0075158 A1 * | 3/2020 | Muthya | G16H 10/60 |
| 2020/0137628 A1 * | 4/2020 | Kandasamy | H04L 67/5651 |
| 2020/0174055 A1 * | 6/2020 | Pampattiwar | H04B 10/035 |
| 2020/0181969 A1 * | 6/2020 | Fitzgibbon | G07C 9/00571 |
| 2020/0220788 A1 * | 7/2020 | Ramanathan | H04B 17/3912 |
| 2020/0221542 A1 * | 7/2020 | Bitran | H04W 12/55 |
| 2020/0323170 A1 * | 10/2020 | Garigan | H04Q 9/00 |
| 2020/0352441 A1 * | 11/2020 | Soykan | A61B 5/0031 |
| 2021/0010316 A1 * | 1/2021 | Hopkins | E05F 15/76 |
| 2021/0043021 A1 * | 2/2021 | Svitak | G07C 9/38 |
| 2021/0044479 A1 * | 2/2021 | Gunnarsson | H04L 41/0806 |
| 2021/0107579 A1 * | 4/2021 | Adam | B60L 50/20 |

(Continued)

*Primary Examiner* — April G Gonzales (57) ABSTRACT

The present invention provides an improved network architecture which allows for many unique and specific interactions between LoRa networked devices, while still maintaining the security, range and low energy benefits of LoRa and LoRaWAN networks.

7 Claims, 9 Drawing Sheets

(56) References Cited

U.S. PATENT DOCUMENTS

| | | | |
|---|---|---|---|
| 2021/0143896 A1* | 5/2021 | Tao | H04W 48/14 |
| 2021/0165092 A1* | 6/2021 | Hester | G01S 13/758 |
| 2021/0185634 A1* | 6/2021 | Yu | H04W 52/0261 |
| 2021/0265949 A1* | 8/2021 | Mangano | G04F 5/063 |
| 2021/0265950 A1* | 8/2021 | Marchand | H03B 5/36 |
| 2021/0266024 A1* | 8/2021 | Marchand | H04B 1/48 |
| 2021/0319894 A1* | 10/2021 | Sobol | G16H 20/30 |
| 2021/0367701 A1* | 11/2021 | Chakraborty | G06N 3/045 |
| 2023/0349697 A1* | 11/2023 | Seube | G08G 5/0021 |

\* cited by examiner

SYSTEM, METHOD AND APPARATUS FOR NON-INVASIVE SENSOR CONFIGURATION AND NETWORKING

RELATED APPLICATIONS

The present application claims priority to U.S. Provisional Application No. 63/191,068 filed May 20, 2021.

BACKGROUND OF THE PRESENT INVENTION

1. Field of the Invention

The present invention relates to a non-invasive sensing system. In particular, the present invention teaches a system, method and apparatus for configuring and coordinating communications within a non-invasive sensor network.

2. Description of Related Art

Sensing within transportation and storage assets is challenging, especially for after-market installations. For example, it is often not permissible to cut holes into the walls of the refrigerated trailer or container pass wires or antennas to internal wired and or wireless sensors such as temperature, humidity, door and cargo sensors. Cargo sensing has been particularly problematic due to temperature changes affecting ultrasonic approaches and frost affecting optical approaches.

LoRa is an RF modulation technology for low-power, long range data transmission. A key characteristic of LoRa is its ultra-low power requirements, which allows for the creation of battery-operated devices that can last for up to 10 years.

Figure 1:
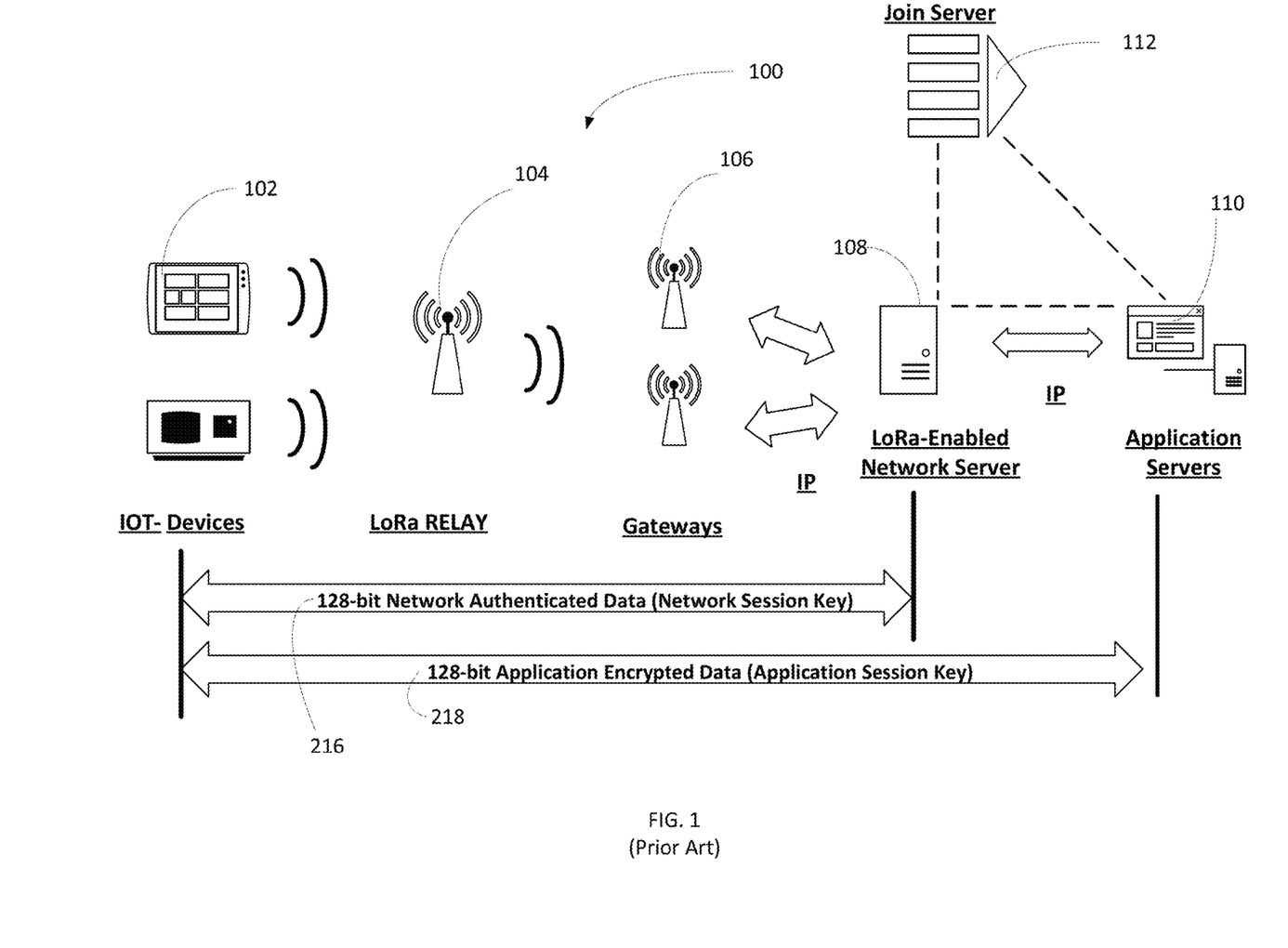
FIG. 1 is a block diagram illustrating an example LoRaWAN network as practiced in the prior art.

Most commonly, LoRa transmitting devices are deployed using a network based on the open LoRaWAN specification. FIG. 1 shows an exemplary LoRaWAN network arrangement 100. As shown, LoRaWAN networks are commonly deployed in a star-of-stars topology in which gateways 106 relay messages between end-devices 102 and central LoRa-enabled network servers 108. Often, LoRa enabled relay transmitters 104 may also be used to further extend network coverage. In practice, the gateways 106 are connected to the LoRa-enabled network server 108 via standard IP connections and act to convert RF packets to IP packets and vice versa. The LoRa-enabled network server 108 of the prior art then connects with application servers 110 using IP protocols.

There are two key elements to the security of a LoRaWAN network: the join procedure and message authentication. The join procedure establishes mutual authentication between an end device and the LoRaWAN network to which it is connected. Only authorized devices are allowed to join the network. LoRaWAN MAC and application messages are origin-authenticated and encrypted end-to-end (i.e., from end device to the application server and vice versa).

Standard LoRaWAN architecture relies on one or more join servers 112 to coordinate message authentication. Specifically, to become authenticated, an end device 102 sends a join request message to the join server 112 (either directly or through a LoRa relay 104). Next, the end device 102 and join server 112 exchange matching, individual root keys. After the join server 112 authenticates the end device 102, it returns a join accept message to the device. Next, the end device derives session keys locally based on the DevEUI, Join EUI, DevNonce, root keys and fields in the join request and join accept messages. On its end, the join server 112 also derives session keys from the serial IDs, root keys and fields in the end device join requests and join accept messages. Finally, the join server 112 shares session keys with the network and application servers 108, 110. The control traffic between the end device and the network server is generally secured with a 128-bit AES Network Session Key (NwkS-Key) 216. The data traffic that travels between the end device and the application server is secured with a 128-bit Application Session Key (AppSKey) 218.

An important feature of LoRa is its use of different sub-gigahertz radio frequency bands for different geographic regions (e.g., 433 MHZ, 868 MHz (Europe), 915 MHz (Australia and North America), 865 MHz to 867 MHz (India) and 923 MHz (Asia)). Because of the lack of a global/universal frequency, frequency management is an important issue when provisioning devices across multiple geographic regions. This is particularly true with on-vessel maritime communications which require continual frequency coordination to comply with local regulations. To completely address this issue, network operators require complex regulatory maps which are difficult to create and maintain automatically for each network and each end device.

In addition to frequency coordination issues, LoRa sensor networks require multiple levels of linked star and star-of-stars networks to operate at scale. At a minimum, a first required network is a network of assets and a second required network is the asset itself and its sensor network. These multiple levels of linked networks make network management complex and network failures difficult to locate and fix. In addition, network diversity is required, and LoRaWAN-only solutions are limited.

What is needed is an improved network architecture which allows for many unique and specific interactions between LoRa networked devices, while still maintaining the security, range and low energy benefits of LoRa and LoRaWAN networks.

SUMMARY OF THE DISCLOSURE

To minimize the limitations found in the prior art, the present invention provides an improved network architecture which allows for many unique and specific interactions between LoRa networked devices, while still maintaining the security, range and low energy benefits of LoRa and LoRaWAN networks.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art. The descriptions, embodiments and figures used are not to be taken as limiting the scope of the claims.

Where the specification describes advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e., meaning "must"). Further, it should also be understood that throughout this disclosure, unless logically required to be otherwise, where a process or method is shown or described, the steps of the method may be performed in any order (including, repetitively, iteratively or simultaneously) and selected steps may be omitted. It will be further understood that the terms "comprise", "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many of the embodiments described herein are described in terms of sequences of actions to be performed by, for example, elements of a controller or computing device. It should be recognized by those skilled in the art that the various sequences of actions described herein can be performed by specific circuits (e.g., application specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

Aspects of the systems and methods described herein may be implemented as functionality programmed into any of a variety of circuitry, chips, and logic devices (e.g., Programmable Logic Devices and the like). Some other possibilities for implementing aspects of the systems and methods discussed herein include without limitation: microcontrollers with memory, embedded microprocessors, firmware, software, etc.

Unless otherwise required, the communication elements of the present invention as discussed below may include any of a mix of modulators, demodulators and/or receivers for a range of protocols including (but not limited to): LoRa, Bluetooth, Bluetooth Low Energy ("BLE"), ZigBee, Thread, Wi-Fi (802.11xxx), 2G-5G, LTE, NFC, RFID, and DigiMesh protocols. Further, the communication elements may be wired, wireless, or combinations thereof and may include components such as modems, gateways, switches, routers, hubs, access points, repeaters, towers, and the like whether illustrated or omitted. Communication and control systems of the present invention may also include signal or data transmitting and receiving circuits, such as antennas, amplifiers, filters, mixers, oscillators, digital signal processors (DSPs), and the like whether illustrated or omitted.

All communications of the present invention may be designed to be duplex or simplex in nature. Further, as needs require, the processes for transmitting data to and from the present invention may be designed to be push or pull in nature. Still further, each feature of the present invention may be made to be remotely processed, activated and/or accessed. Additionally, data may be uploaded to and downloaded from the present invention as needed.

Referring now to FIGS. 2-7, aspects of exemplary systems in accordance with the present invention shall now be discussed. As should be understood, the systems disclosed in FIGS. 2-7 are exemplary systems into which the features of the present invention may be integrated. Accordingly, the figures are intended to be illustrative and any of a variety of systems may be used with the present invention without limitation. For example, in some embodiments the present invention is discussed with respect to a tractor-trailer arrangement (i.e., a tractor unit attached to a box trailer), but the present invention may equally be used with any other type of monitored asset, location or container arrangement without limitation. For example, alternatives may include any type of truck, semi-truck, refrigerated trailer, shipping container, intermodal container, geographic site, monitored device, container chassis or the like.

Figure 2:
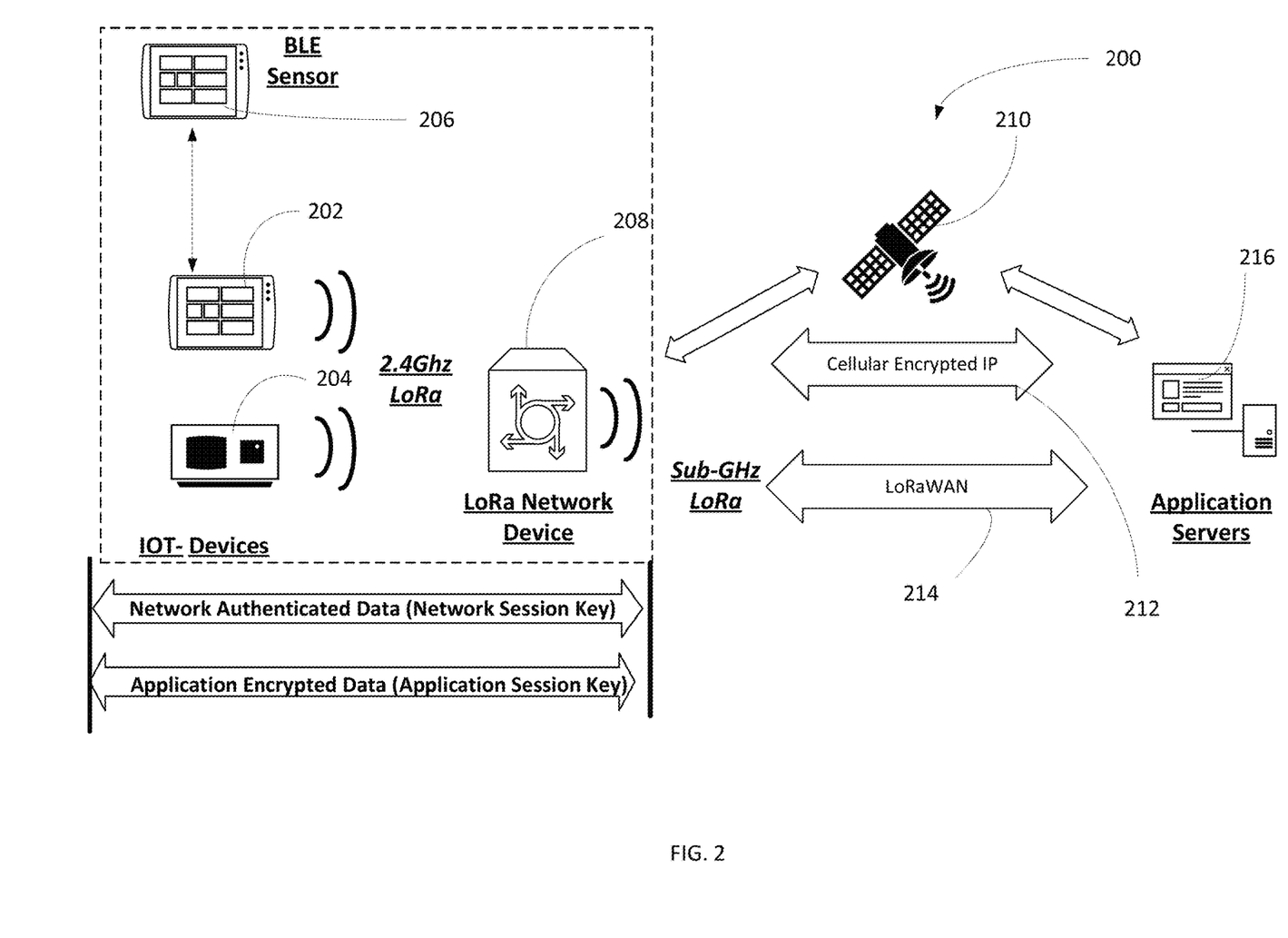
FIG. 2 is a block diagram illustrating an example network in accordance with a first preferred embodiment of the present invention.

Referring now to FIG. 2, an example network 200 in accordance with a first preferred embodiment of the present invention shall now be discussed. As shown, the system of the present invention preferably may include a plurality of various sensors/IoT devices 202-206 for monitoring various aspects of a given area, enclosure or asset. As discussed further below, the networked devices for use with the present invention may preferably include LoRa transceivers for communicating with the LoRa network device 208 of the present invention. Preferably, each of the devices 202-206 may further include BLE transceivers to allow for short range communications between the sensor/IoT devices 202-

206 and a BLE enabled smart phone device (e.g., smart phones, laptops, PDA and the like without limitation). According to further alternative preferred embodiments, selected IoT devices 202, 204 including both LoRa and BLE transceivers may be linked with one or more BLE-only sensors 206 which are not equipped with LoRa transceivers. In these cases, the dual LoRa-BLE enabled devices 202-204 may receive data from the BLE-only sensors 206 and may selectively relay the BLE sensor data within the LoRaLAN network as discussed further below.

The LoRa enabled devices/sensors 202, 204 of the present invention may preferably link to and form a local area network (i.e., a LoRaLAN) with the LoRa network device 208 as discussed further below. Preferably, the LoRaLAN connected devices may communicate using LoRa modulation at a given, fixed frequency regardless of region. Preferably, the fixed frequency may be within the range of 900 MHz-6 GHz. According to a preferred embodiment, the LoRaLAN of the present invention may operate at a fixed frequency of 2.4 GHz.

Figure 3:
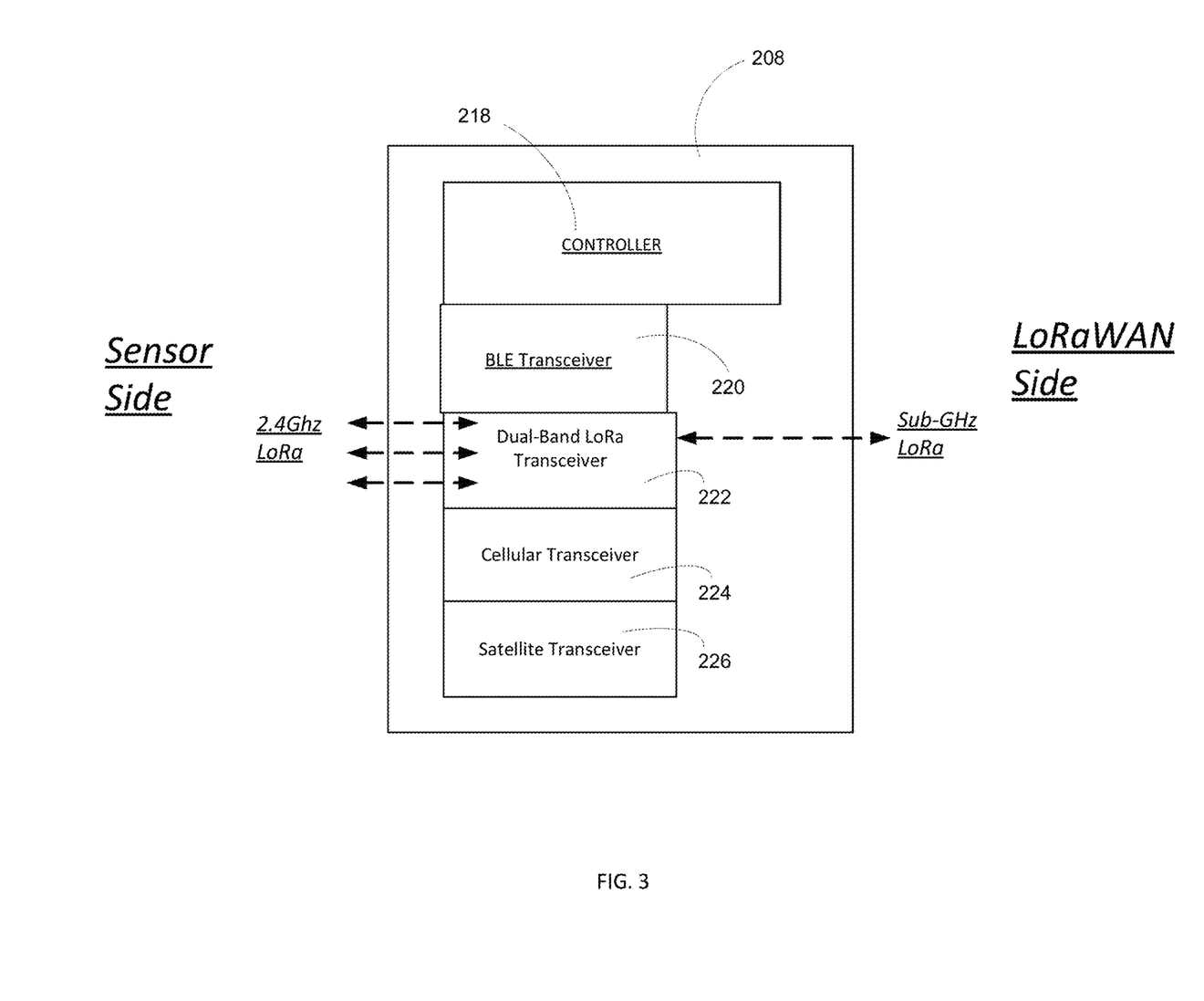
FIG. 3 is a block diagram illustrating an exemplary LoRa network device in accordance with aspects of the present invention.

Referring now to FIG. 3, the exemplary LoRa network device 208 of the present invention may include a main controller 218, a BLE transceiver 220, a LoRa transceiver 222, a cellular transceiver 224 and a satellite transceiver 226. Preferably, the controller 218 of the present invention may control communications between IoT devices/sensors 202-204 and upstream application servers 216. As shown, the LoRa network device 208 may preferably provide dual-band LoRa communications so that the LoRa network device 208 may use a first fixed frequency (e.g., 2.4 GHz) to communicate with IoT devices/sensors 202-206; and may use different LoRa frequencies (i.e., Sub-GHz regional frequencies) to link to distant LoRaWAN network servers. Additionally, LoRaLAN data may be routed to other data networks as detailed further below.

Figure 4:
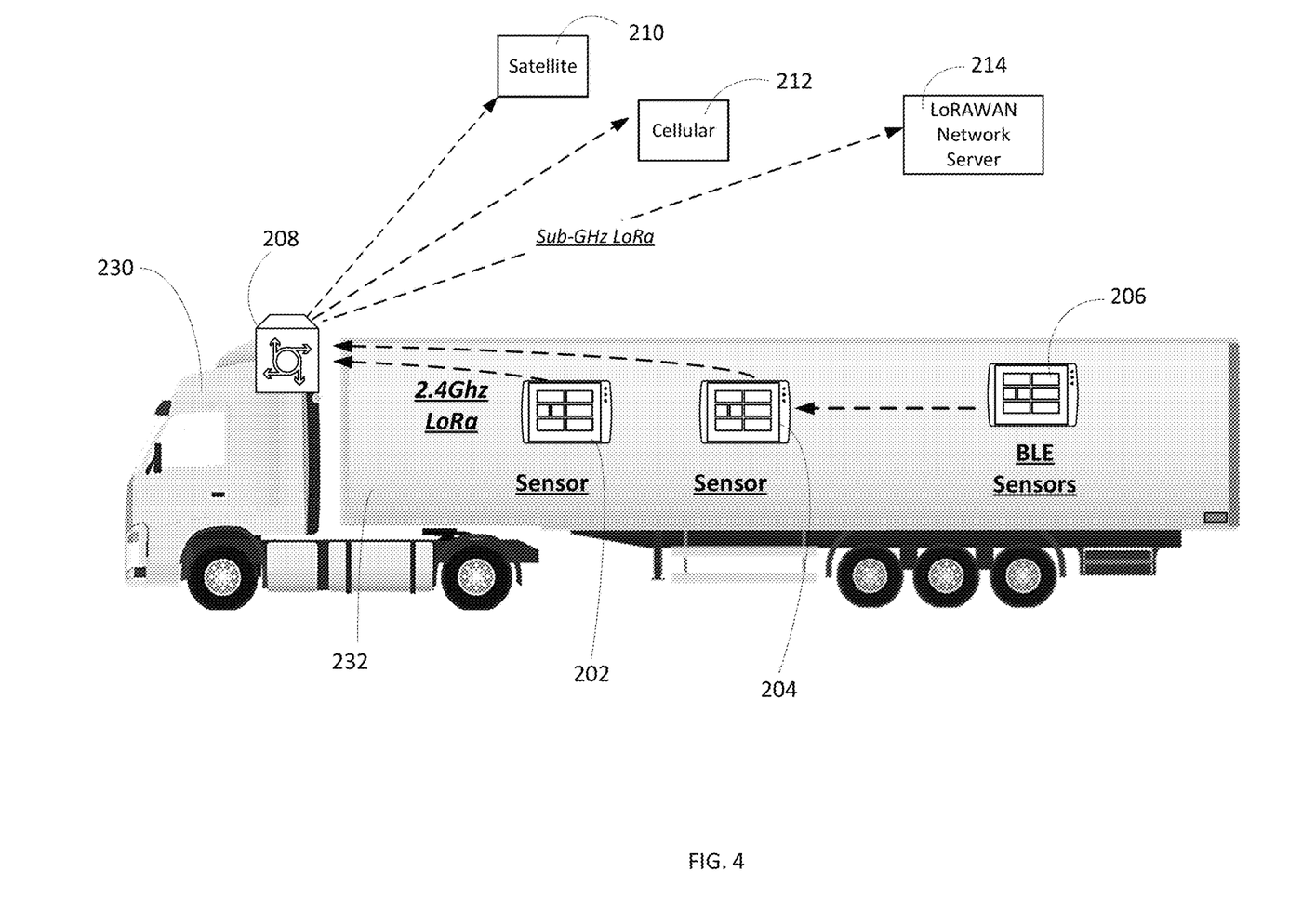
FIG. 4 is a diagram illustrating an example network configuration in accordance with a further preferred embodiment of the present invention.

Referring now to FIG. 4, the LoRa network device 208 of the present invention may for example be used within a tractor-trailer arrangement or similar conveyance to monitor tracked local sensors 202-206. As shown, the exemplary LoRa network device 208 may for example be attached to a truck cab 230 and may preferably communicate with multiple IoT devices/sensors 202-206 (e.g., door sensors, reefer cargo sensors, temperature probes etc.) within the trailer 232. As shown, the LoRa network device 208 may preferably communicate with the local sensors 202-206 using 2.4 GHz LoRa (or other >GHz frequency). For communication with upstream LoRaWAN networks 214, the LoRa network device 208 may preferably be restricted to a sub-GHz LoRa frequency which may be selected based on the detected geolocation/region.

Figure 9:
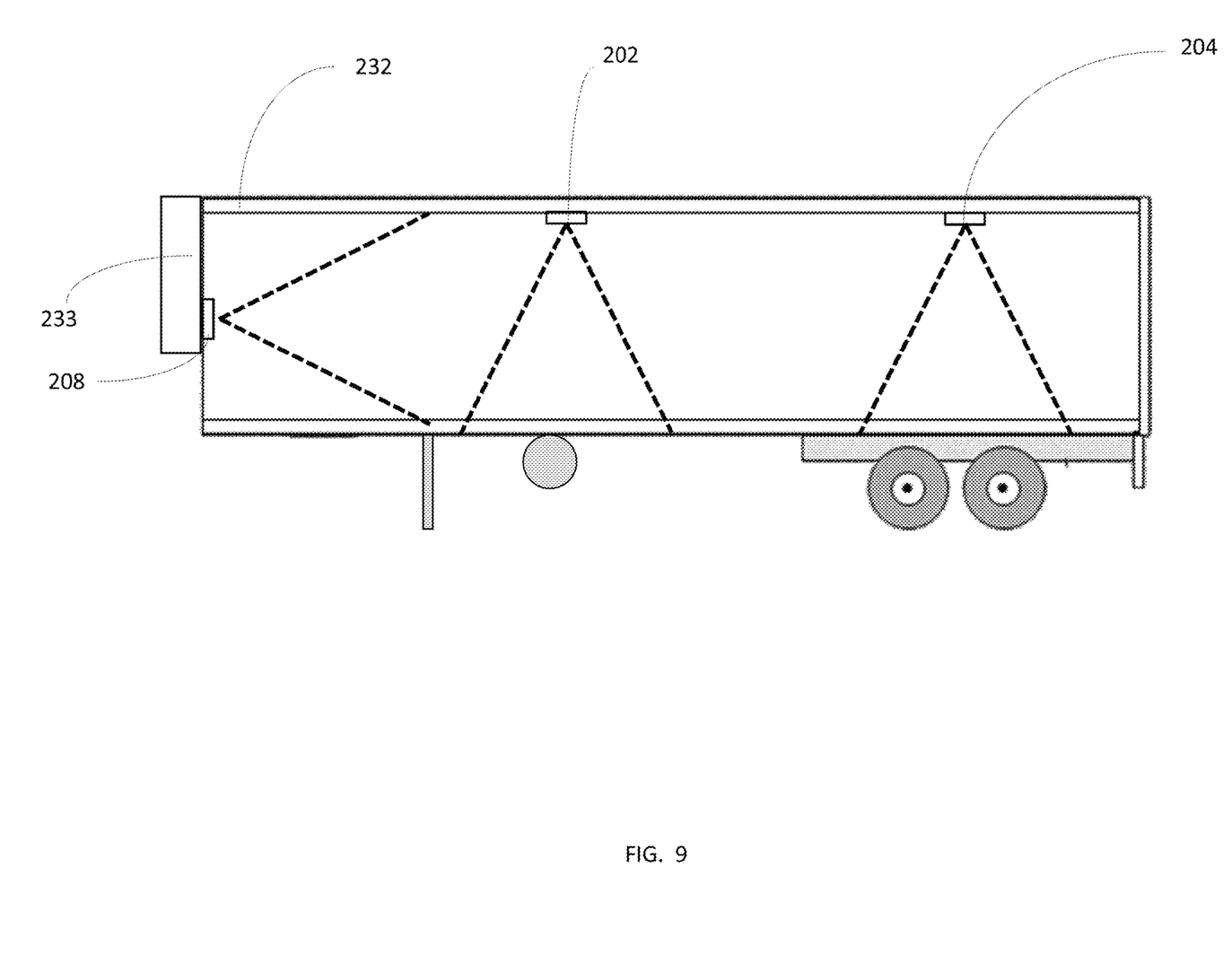
FIG. 9 is a diagram illustrating an exemplary installation with multiple cargo sensors cover different zones and angles to provide fractional cargo sensing (% loaded).

As shown in FIG. 9, the LoRa network device 208 may be attached to or integrated within a refrigeration unit 233 or the like. As further shown, the exemplary sensors 202, 204 of the present invention may be installed in a number of locations to cover different zones and angles to provide fractional cargo sensing (e.g., the percent of container which is loaded).

Figure 8:
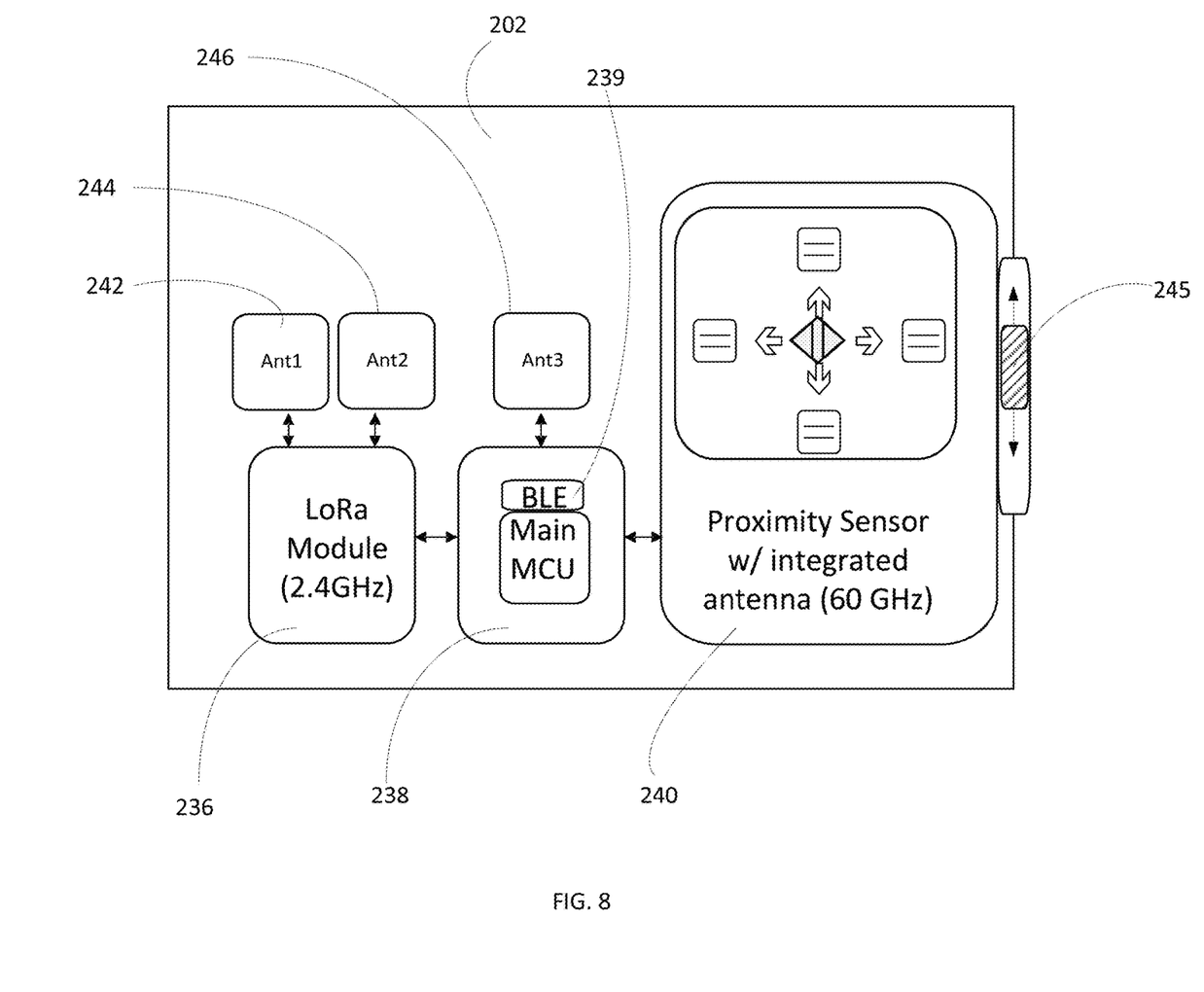
FIG. 8 is a block diagram of wireless cargo sensor suitable for cargo sensing in refrigerated transportation applications.

Referring now to FIG. 8, a block diagram of an exemplary wireless cargo sensor 202 in accordance with aspects of the present invention is provided. As shown, the exemplary cargo sensor 202 preferably may include a proximity sensor 240, a LoRa module 236, and a Main MCU module 238 which may preferably include an integrated BLE chip/module 239 and an antenna 246. As shown, the LoRa module 236 may preferably include one or more antennas 242, 244 to allow the LoRa module 236 to receive and transmit both within the LoRaLAN (e.g., at 2.4 GHz or the like) and within the longer distance LoRaWAN (e.g., sub 2.4 GHz). Additionally, other transceivers and antennas may be included to allow connections with other networks (e.g., cellular, satellite). According to a preferred embodiment, the wireless cargo sensor 202 may preferably also include a lens 245 to allow the proximity sensor to direct and receive locating beams (e.g., IR, ultra-sonic and the like) from within a given area. According to a further preferred embodiment, the lens 245 may preferably be an offset lens which may be adjustable to produce directed, offset beams/transmissions.

Figure 5:
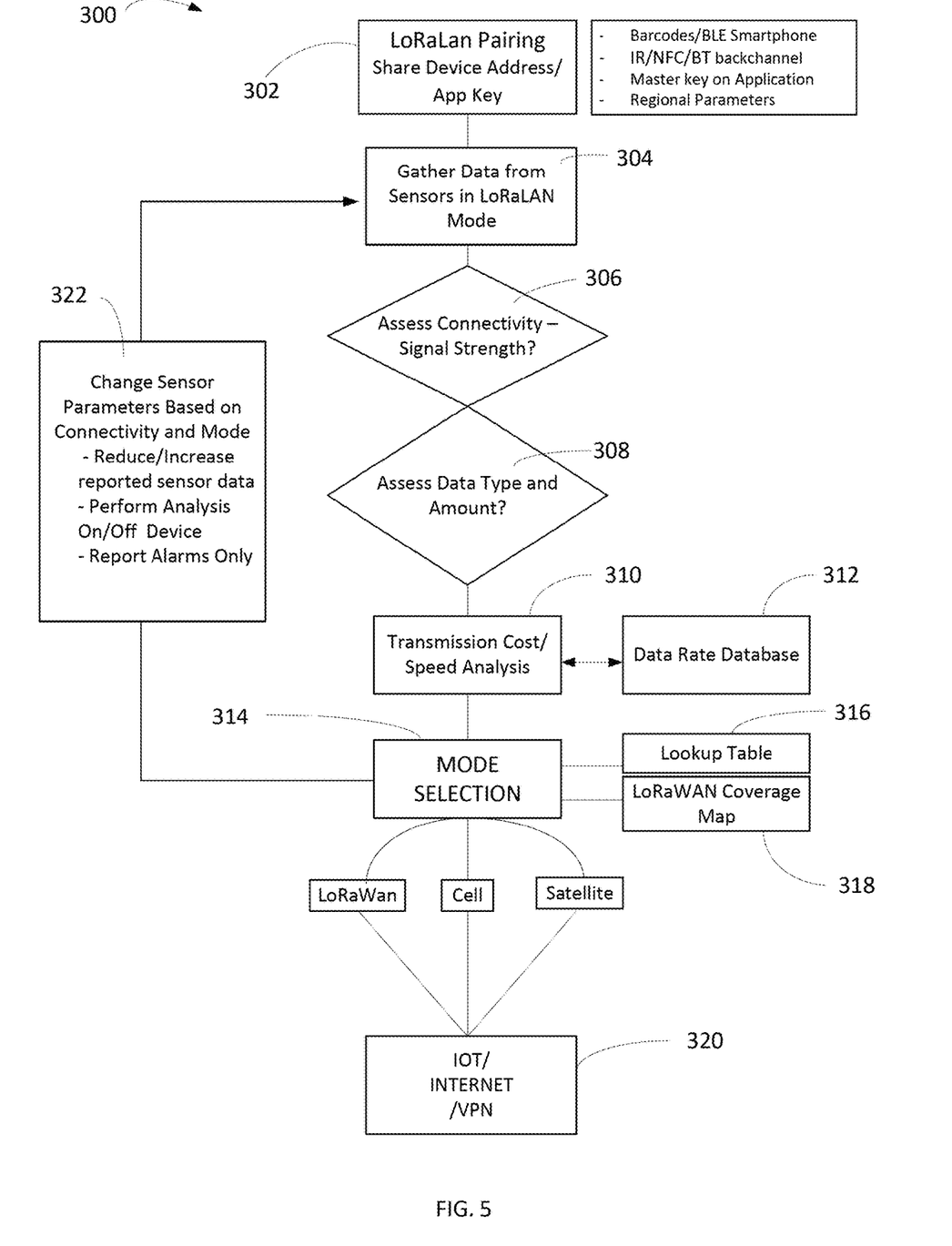
FIG. 5 is a flow chart illustrating an exemplary method for managing a network in accordance with the present invention.

With reference now to FIG. 5, an exemplary method 300 for receiving and transmitting sensor data in accordance with the present invention shall now be discussed. As shown, at a first step 302, the LoRa network device 208 may preferably be paired with one or more IoT/sensor devices 202-206 to form a LoRaLAN. According to preferred embodiments, this pairing may be accomplished in any number of ways including manual entry, code scanning or over-the-air via backchannel communications (e.g., IR/NFC/BLE/ZigBee/Bluetooth) as discussed with reference to FIGS. 6 and 7 below.

Once paired, the LoRa network device 208 (at next step 304) preferably gathers data from the paired IoT devices 202-206 within the LoRaLAN. As discussed above, the LoRa communications within the LoRaLAN may preferably be at a fixed frequency (e.g., 2.4 GHz LoRa). Preferably the LoRaLAN communications are acknowledged one-way communications to guarantee delivery of sensor data while maximizing battery life by minimizing receiver on-time. To further optimize sensor and hub battery life, periodic wakeup intervals supporting a limited number of LoRaLAN sensors may be used. In a preferred embodiment, the number of LoRaLAN sensors is limited to 8. At a next step 306, the LoRa network device 208 preferably assesses signal strength of available wide area networks that can reach network servers 214. Additionally, at a next step 308, the system preferably assesses the attributes of received sensor data such as data types and amounts. At a next step 310, the system may further calculate the expected transmission costs and speeds for retransmitting the received data. Such calculations may include receiving rate data from remote databases 312 and comparing the rate data to the determined location of the LoRa network device 208.

At a next step 314, the system may then proceed to determine a data transmission mode for selected sets of data. According to a preferred embodiment, the system may determine the data transmission mode based on detected transmission modes available (e.g., LoRaWAN, cellular, satellite, ethernet, Wi-Fi etc.) and their relative costs and speeds for the types/amounts of sensor data received. Further, mode selection 314 may include the use of a look-up table 316 or the like which may include pre-determined transmission modes based on detected data types, amounts, locations and the like. As shown in example Table 1 below, the system may for example ENABLE only specific transmission modes depending on the type of sensor data received and the types of transmission modes available. Higher priority sensor data (e.g., alarms) may be enabled for all transmission modes, and lower priority sensor data (e.g., bulk data) may be restricted to only a subset of transmission modes as they become available.

TABLE 1

|  | Cellular | Satellite | LoRaWAN |
|---|---|---|---|
| STATUS | Enabled | Enabled | — |
| ALARMS | Enabled | Enabled | Enabled |
| BULK DATE | Enabled | — | — |
| DIAGNOSTICS | Enabled | Enabled | — |

Where multiple transmission modes are available and enabled, the system may further determine a transmission mode based on detected signal strength. With respect to LoRaWAN transmissions, the LoRa network device 208 may be restricted from communicating with LoRaLAN linked sensors while data is being transmitted or received from the LoRaWAN network. Alternatively, the LoRa network device 208 may include more than one LoRa transceiver. Further, the mode selection 314 may include the use of LoRaWAN coverage maps 318, geofenced areas and the like to determine the relative distances between networks.

Along with mode selection, the system (at step 322) may also change one or more sensor parameters based on the determined connectivity and mode. For example, the system may adjust network sensors to reduce/increase reported sensor data, report alarms only, and/or to perform selected analytical functions ON/OFF the device. At a next step 320, the system may initiate communications using the selected mode.

Figure 6:
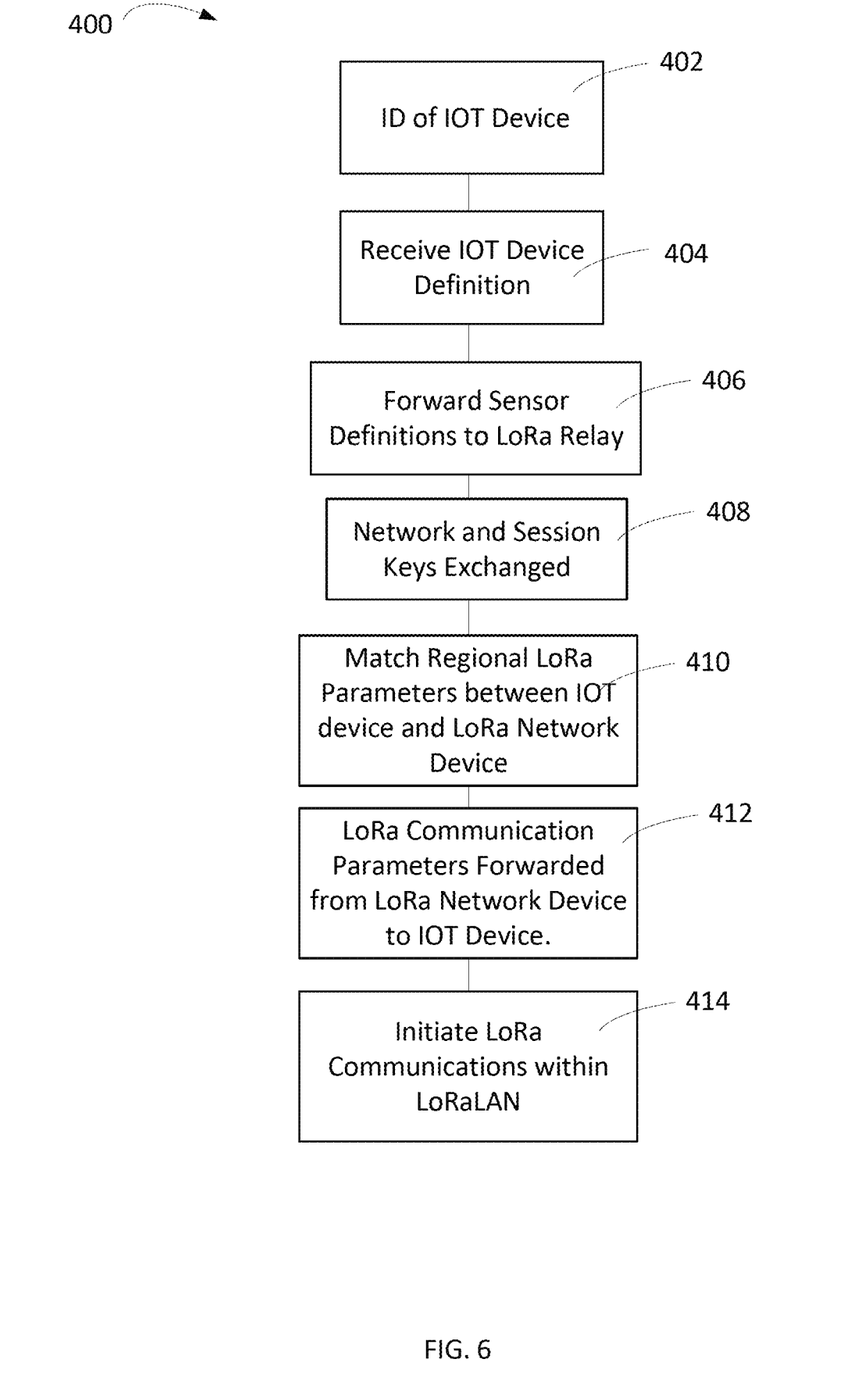
FIG. 6 is a flow chart illustrating an exemplary method for pairing devices in accordance with the present invention.
Figure 7:
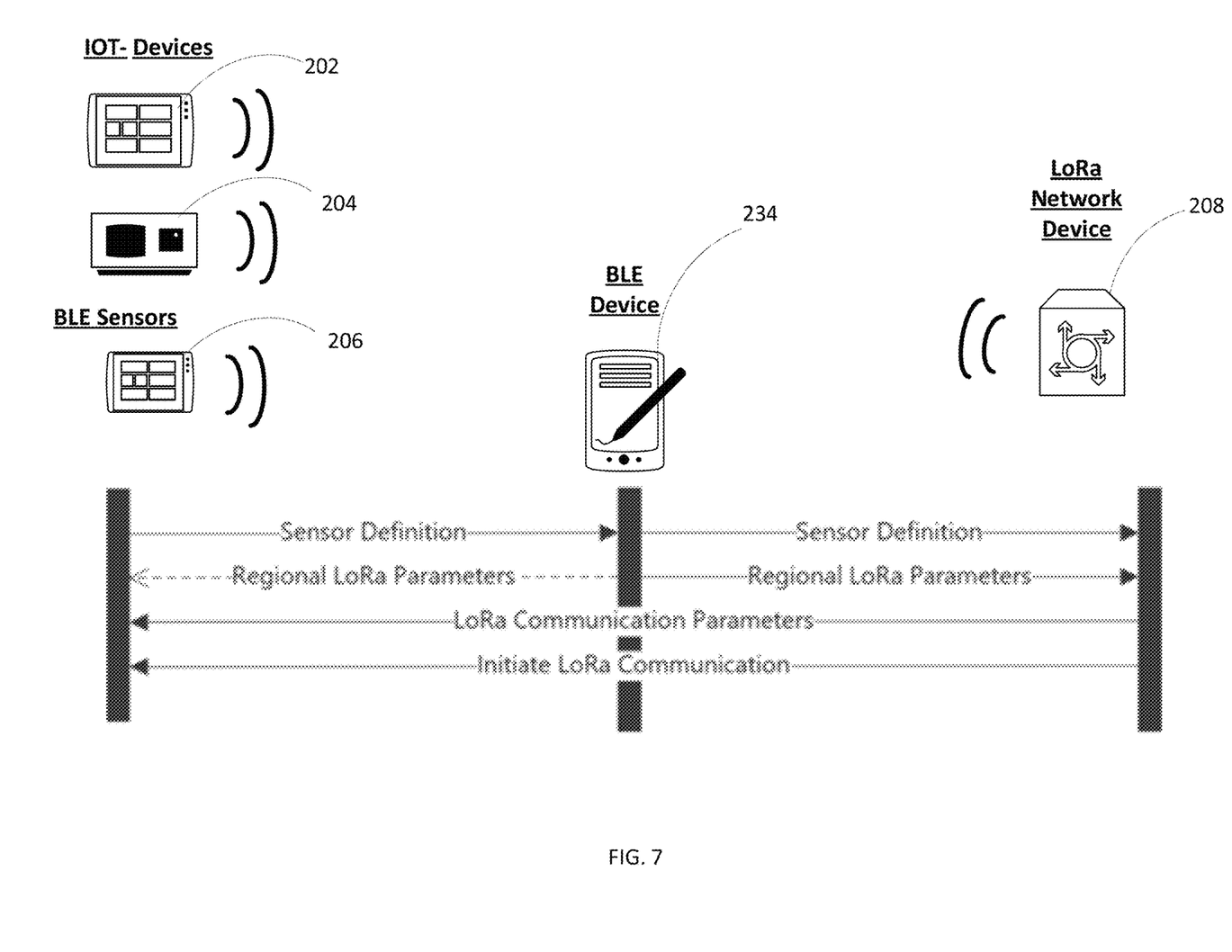
FIG. 7 is a schematic diagram illustrating aspects of the exemplary methods discussed in FIGS. 5 and 6.

With reference now to FIGS. 6 and 7, an exemplary method for pairing a LoRa network device 208 and IoT devices 202-206 (i.e., sensors, monitors etc.) using a BLE enabled smartphone 234 (or other BLE enabled device) shall now be discussed. As shown in FIG. 6, a first step 402 may preferably include identifying the IoT device to be paired. According to a first preferred embodiment, the BLE smartphone 234 may identify the IoT device by manually entering a device ID or scanning a bar code or the like. Alternatively, the device ID may be obtained via polling using an IR/NFC/BT/BLE signal or the like.

According to preferred embodiments, LoRa IoT devices/sensors without BLE may be paired with the LoRa network device 208 of the present invention in a number of alternative ways. For example, the BLE smartphone 234 may use labels/barcodes to identify the non-BLE IoT devices/sensors (e.g., locate sensor network IDs) and to lookup pairing information. For security, label information may preferably be encrypted with a master key residing in the application. The BLE smartphone 234 may then relay the pairing information to the IoT device via Bluetooth or the like.

For BLE sensors without LoRa transceivers (e.g., BLE only sensors), selected LoRa-enabled IoT devices/sensors may establish local sensor networks using BLE and then relay the received BLE sensor data via LoRa within the LoRaLAN. In this way, the present invention may provide a local backhaul of BLE sensors using the LoRaLAN. In each of these configurations, the local LoRaLAN transmissions to the LoRa network device 208 (i.e., 2.4 GHz LoRa) would be used primarily for asset penetration (i.e., transmitting from within a closed trailer) and the LoRa network device 208 would retransmit the received signals to the more distant networks via cellular/satellite/LoRaWAN etc. as discussed above.

Once the IoT device ID is received (step 404), at a next step 406, the IoT device definitions (e.g., security keys, device ID, sensor type etc.) are preferably forwarded to the LoRa network device 208, via smartphone 234. At next steps 408 and 410, network and session keys are exchanged and regional LoRa parameters (e.g., frequency band, maximum power output) are matched, again via smartphone 234. At a next step 412, the LoRa communication parameters of the LoRaLAN (e.g., read frequency, sensor parameters) are sent to the IoT device. At a next step 414, LoRa communications within the established LoRaLAN are initiated between the paired IoT device and the LoRa network device 208.

What is claimed is:

1. A method for pairing a LoRa network device and one or more IoT devices, the method comprising:
   identifying a first IoT device to be paired;
   confirming that the first IoT device comprises a LoRa transceiver;
   identifying a second IoT device to be paired;
   determining whether the second IoT device comprises a LoRa transceiver; wherein if the second IoT device is determined be without a LoRa transceiver, the method further comprises the step of: establishing a first local sensor network using BLE and relaying a first set of received BLE sensor data via LoRa within a first LoRaLAN network; wherein a first set of LoRa transmissions to the LoRa transceiver are used for asset penetration; wherein the LoRa transceiver is configured to retransmit received signals from within an asset to one or more remote networks;
   forwarding IoT device definitions to the LoRa transceiver via BLE;
   exchanging network and session keys;
   matching regional LoRa parameters;
   transmitting the LoRa communication parameters of the first LoRaLAN network to the first IoT device; wherein the LoRa communication parameters comprise parameters selected from a first group of parameters comprising: read frequency and sensor parameters; and
   establishing LoRa communications within the first LoRaLAN network between at least one paired IoT device and the LoRa network device.

2. The method of claim 1, wherein a first BLE-enabled smartphone identifies the first IoT device via scanning a bar code identifying the first IoT device ID.

3. The method of claim 1, wherein a first BLE-enabled smartphone identifies the first IoT device via polling using a BLE signal.

4. The method of claim 1, wherein a first BLE smartphone is configured to identify a non-BLE IoT device via scanned label information.

5. The method of claim 1, wherein the LoRa transceiver is configured to retransmit received signals from within the asset to one or more remote networks via a cellular network.

6. The method of claim 1, wherein the LoRa transceiver is configured to retransmit received signals from within the asset to one or more remote networks via a sub-gigahertz radio frequency band.

7. The method of claim 1, wherein the IoT device definitions are forwarded to the LoRa transceiver via a first BLE-enabled smartphone.

* * * * *